United States Patent [19]  [11] 3,891,657
Monkovic et al. [45] June 24, 1975

[54] 9BETA-HYDROXY-5-METHYL-6,7-BENZOMORPHANS

[75] Inventors: Ivo Monkovic, Candiac; Michel Saucier, Dorval, both of Canada; Thomas Alfred Montzka, Manilus, N.Y.

[73] Assignee: Bristol-Myers Company, New York, N.Y.

[22] Filed: Sept. 26, 1973

[21] Appl. No.: 400,861

Related U.S. Application Data

[63] Continuation-in-part of Ser. No. 301,049, Oct. 26, 1972, abandoned.

[52] U.S. Cl.: 260/293.54; 260/240 K; 260/DIG. 13; 424/267
[51] Int. Cl. .................................. C07d 39/00
[58] Field of Search .............. 260/293.54, DIG. 13

[56] References Cited
UNITED STATES PATENTS

| | | | |
|---|---|---|---|
| 3,322,778 | 5/1967 | Kupchan et al | 260/294.7 |
| 3,474,106 | 10/1969 | Ziering | 260/294.7 |
| 3,513,169 | 5/1970 | Robinson et al | 260/294.7 |
| 3,514,463 | 5/1970 | Robinson et al | 260/294.7 |
| 3,632,591 | 1/1972 | Albertson et al | 260/293.54 |
| 3,639,407 | 2/1972 | Clarke et al | 260/293.54 |
| 3,639,410 | 2/1972 | Albertson et al | 260/293.54 |
| 3,647,806 | 3/1972 | Cross | 260/293.54 |
| 3,700,734 | 10/1972 | Robinson et al | 260/293.54 |

OTHER PUBLICATIONS

May et al., J. Org. Chem. 26, 1621–1624 (1961).
May et al., J. Org. Chem. 26, 4536 (1961).

*Primary Examiner*—G. Thomas Todd
*Attorney, Agent, or Firm*—Robert E. Havranek

[57] ABSTRACT

N-Substituted -9β-hydroxy-5-methyl-6,7-benzomorphans have been found to possess potent narcotic agonist and/or antagonist activity. In particular, the compound 2'-hydroxy-2-cyclopropylmethyl-5-methyl-9β-hydroxy-6,7-benzomorphan has been found to possess potent narcotic agonist and antagonist activity. These compounds are prepared by total synthesis and are not derived from opium alkaloids.

6 Claims, No Drawings

9 BETA-HYDROXY-5-METHYL-6,7-BENZOMORPHANS

CROSS-REFERENCE TO RELATED APPLICATION

This application is a continuation-in-part of copending application Ser. No. 301,049, filed Oct. 26, 1972, now abandoned.

BACKGROUND OF THE INVENTION

1. Field of the Invention

This invention embodies new and novel compounds useful as analgesics and/or narcotic antagonists and a new and novel total synthesis for their preparation.

2. Description of the Prior Art

A. Everette May and Hiroshi Kugita, *J. Org. Chem.* 26, 188 (1961) describe compounds having the formula

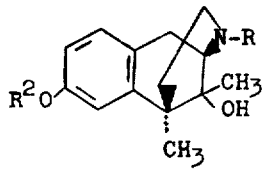

in which $R^2$ is H or methyl and R is methyl or phenethyl as being moderate to weak analgetics.

B. Everette May, James Murphy and J. Harrison Ager, *J. Org. Chem.* 25, 1386 (1960) report compounds having the formula

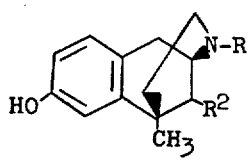

in which R is methyl or phenethyl and $R^2$ is H or methyl as being potent analgetics.

C. Everette May, Hiroshi Kugita and J. Harrison Ager, *J. Org. Chem.* 26, 1621 (1961) report compounds having the formula

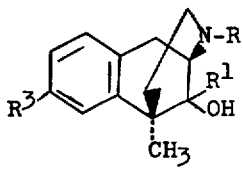

in which R is methyl or phenethyl, $R^1$ is methyl or H, $R^3$ is H, OH or methoxy as producing varying degrees of analgesia.

D. Everette May, Colin Chignell and J. Harrison Ager, *J. Med. Chem.* 8, 235 (1965) report compounds having the formula

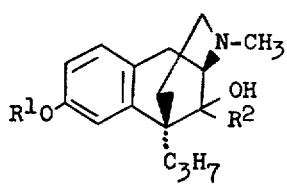

in which $R^1$ is H or methyl and $R^2$ is methyl as possessing analgetic activity.

E. Everette May and Hiroshi Kugita, *J. Org. Chem.*, 26, 1954 (1961) report the compound having the formula

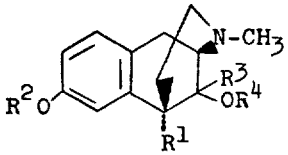

in which R is methyl or phenethyl, $R^1$ is H or methyl and $R^2$ is H or acetyl as having analgetic activity.

G. Everette May and Seiichi Sato, *J. Org. Chem.* 26, 4536 (1961) report compounds having the formula

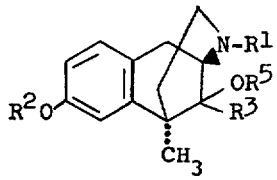

in which $R^2$ is H or methyl, $R^1$ is methyl or ethyl, $R^3$ is methyl or ethyl and $R^4$ is H or acetyl as possessing analgetic activity.

H. N. B. Eddy and E. L. May published a review of 6,7-benzomorphans in Synthetic Analgetics, Pergamon Press (1966).

SUMMARY OF THE INVENTION

Compounds having the formula

L wherein $R^1$ is selected from the group comprising
$-CH_2-C \equiv CH$, $-CH_2-CH=CH_2$, $-CH_2-CH=C\begin{smallmatrix}CH_3\\CH_3\end{smallmatrix}$, $-CH_2-\triangleleft R^6$, $-CH_2-\square^{R^6}$, $-CH_2-\triangleleft\begin{smallmatrix}CH_3\\\end{smallmatrix}$, $-CH_2-CH=CH$,
$\hspace{9cm}|$
$\hspace{9cm}Cl$ $-CH_2-\triangleleft_{CH_2}$, $-CH_2-\bigcirc$, $-CH_2-\square$ and (lower)alkenyl in which $R^6$ is H or $CH_3$, $R^2$ is selected from the group comprising H, (lower)alkyl, $-\overset{O}{\underset{\|}{C}}-\underset{}{\bigcirc}N\rightarrow O$, (lower)acyl, $-\overset{O}{\underset{\|}{C}}-\underset{}{\bigcirc}N$, $-\overset{O}{\underset{\|}{C}}-\underset{N}{\bigcirc}$ and $-\overset{O}{\underset{\|}{C}}-\underset{N\rightarrow O}{\bigcirc}$, $R^5$ is H, (lower)acyl, trichloroacetyl or cinnamoyl; $R^3$ is H, $CH_3$, $C_2H_5$, $N=C_2H_7$, $-CH_2-CH=CH_2$ or $-CH_2-C\equiv CH$, or a pharmaceutically acceptable acid addition salt thereof are analgetic agents, narcotic antagonists or intermediates in the preparation of such agents.

DISCLOSURE OF THE INVENTION

This invention relates to the total synthesis of new and novel N-substituted-9β-hydroxy-5-methyl-6,7-benzomorphans having the formula

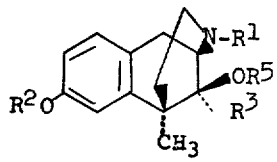

XXXX wherein R¹ is selected from the group comprising
—CH₂—C ≡ CH, —CH₂—CH=CH₂,

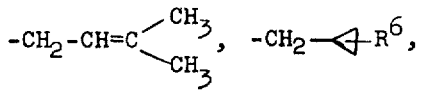

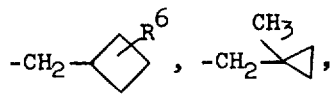

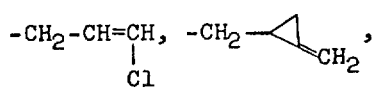

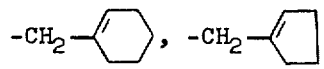

and (lower)alkenyl in which R⁶ is H or CH₃, R² is selected from the group comprising H, (lower)alkyl,

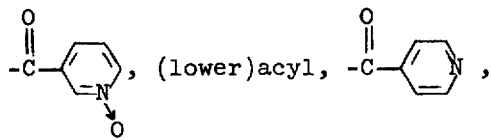

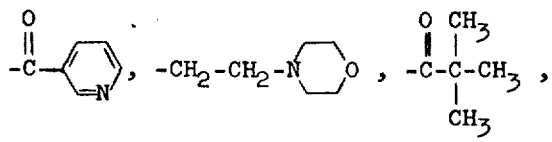

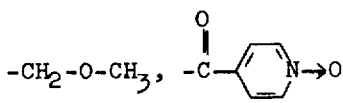

and

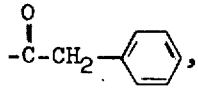

R⁵ is H, (lower)acyl, trichloroacetyl or cinnamoyl; R³ is H, CH₃, C₂H₅, N—C₃H₇, —CH₂—CH=CH₂ or —CH₂—C ≡ CH; or a pharmaceutically acceptable acid addition salt thereof.

Drug abuse by thrill-seeking youth or by people looking for an escape from the realities of every day life has become more and more common place in our present society. One class of widely abused drugs are the narcotic analgetics such as codeine, morphine, meperidine, etc. It is because of the high addictive potential of these agents that much time and money are being expended by the pharmaceutical industry and by governments to try and discover and develop new nonaddicting analgetics and/or narcotic antagonists.

It was therefore an object of the present invention to find new and novel compounds that have these characteristics.

It was further an object of the present invention to develop a method of synthesis that would not be dependent upon opium alkaloids as starting materials and yet would be commercially feasible.

The objectives of the present invention have been achieved by the provision of the compounds of formula L and by their total synthesis from the readily available starting material 7-methoxy-3,4-dihydro-2[1H]-naphthalenone (I).

The compounds of the instant invention have the basic benzomorphan nucleus which is numbered and represented by the following plane formula

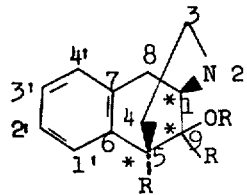

Although there are three asymetric carbons (asterisks) in the benzomorphan molecule, only two diastereoisomeric (racemic) forms are possible, because the iminoethano system, attached to position 1 and 5, is geometrically contained to a cis-(1,3-diaxial)-fusion. These racemates can therefore differ only in the configuration of carbon 9. The only variable will be the cis and trans relationship of the 9-hydroxy compound to the iminoethano system. When in the compounds of the present invention the 9-hydroxy is trans to the iminoethano system, we have the 9α-hydroxybenzomorphans. When the 9-hydroxy is cis to the iminoethano system, we have the 9β hydroxybenzomorphans.

The use of a graphic representation of a benzomorphan is meant to include the dl racemic mixture and the resolved d and l isomers thereof.

The compounds of the present invention, the 9β-hydroxybenzomorphans, can exist as two optical isomers, the levorotatory and dextrorotatory isomers. The optical isomers can be graphically illustrated as:

9β-Hydroxybenzomorphan

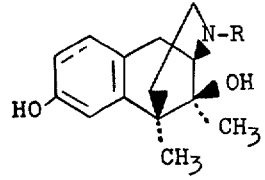

and

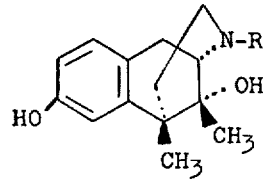

The present invention embodies all of the isomers including the optical isomers in their resolved form.

The optical isomers can be separated and isolated by fractional crystallization of the diastereoisomeric salts formed, for instance, with d- or l- tartaric acid or D-(+)-α-bromocamphor sulfonic acid. the levorotatory isomers of the compounds of the present invention are the most preferred embodiments. Other acids commonly used for resolution can also be employed.

For the purpose of this disclosure, the term "(lower-

)alkyl" is defined as an alkyl radical containing 1 to 6 carbon atoms. "(Lower)alkyl" is defined as a hydrocarbon radical of 3 to 7 carbons containing one double bond. The term "(lower)acyl" is an acyl radical of 2 to 6 carbon atoms, e.g., acetyl, propionyl, isobutyryl, etc. The term "pharmaceutically acceptable acid addition salt" is defined to include all those inorganic and organic acid salts of the compounds of the instant invention, which salts are commonly used to produce non-toxic salts of medicinal agents containing amine functions. Illustrative examples would be those salts formed by mixing the compounds of formula L with hydrochloric, sulfuric, nitric, phosphoric, phosphorous, hydrobromic, maleic, malic, ascorbic, citric or tartaric, pamoic, lauric, stearic, palmitic, oleic, myristic, lauryl sulfuric, napthalinesulfonic, linoleic or linolenic acid, fumaric, and the like.

The compounds of the instant invention are prepared by a total synthesis comprising multiple steps. Surprisingly, the synthesis is efficient and appears commercially feasible. The process is outlined in Charts I and II.

CHART I

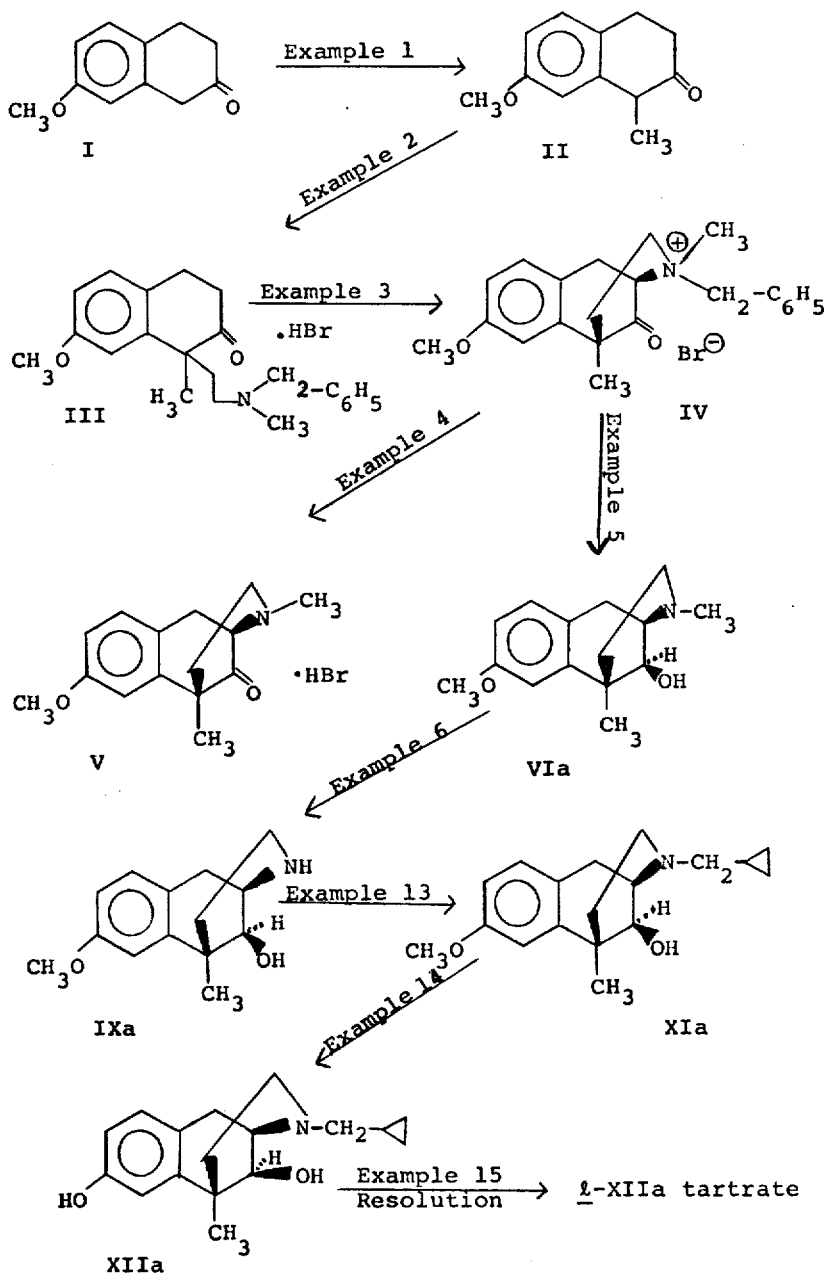

CHART II

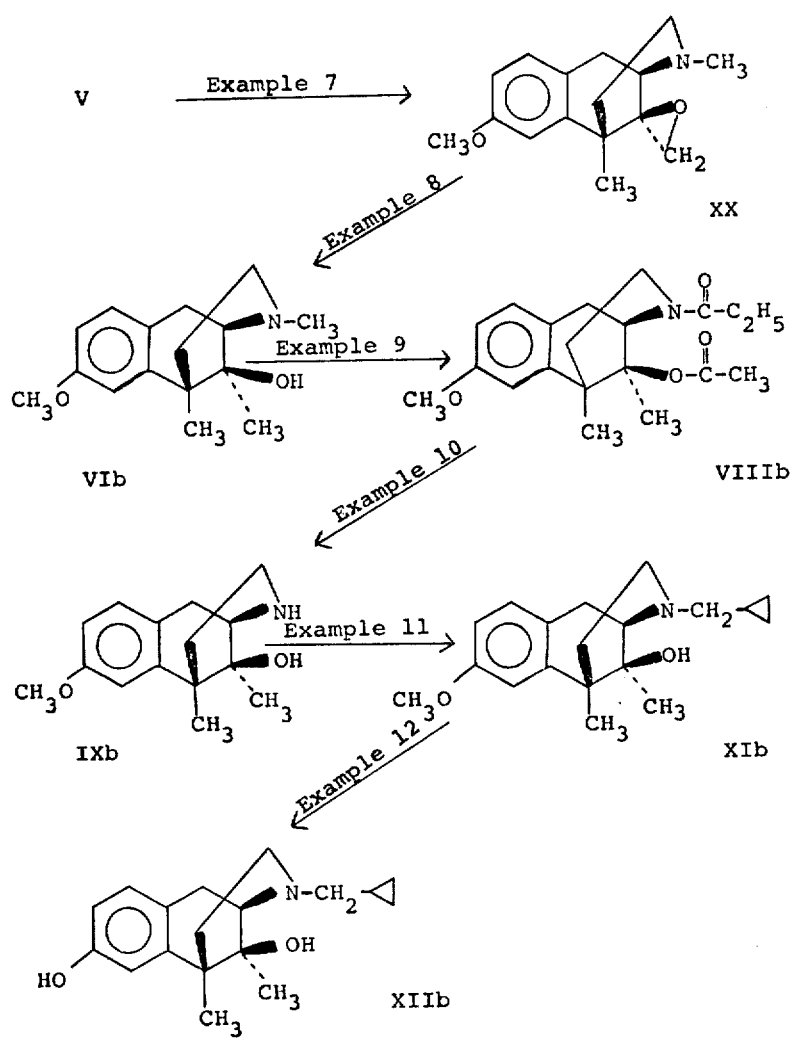

A preferred embodiment is the compounds having the formula

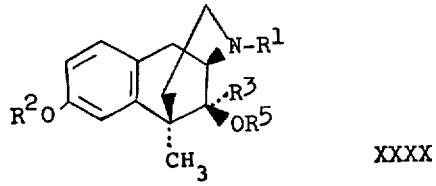

XXXX wherein R¹ is selected from the group comprising —CH$_2$—CH ≡ CH, —CH$_2$—CH=CH$_2$,

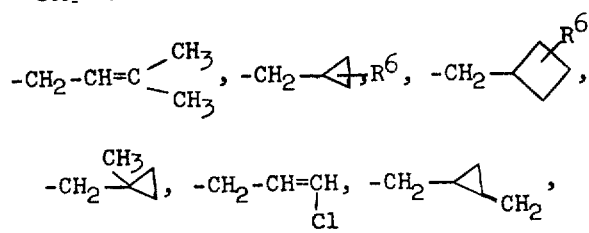

and C$_{3-7}$ alkenyl in which R⁶ is H or CH$_3$; R² is selected from the group comprising H, (lower)alkyl, (lower)acyl,

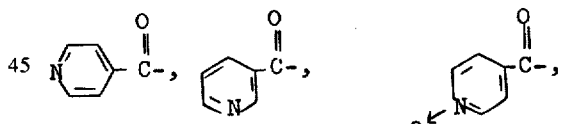

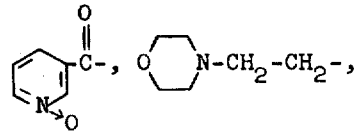

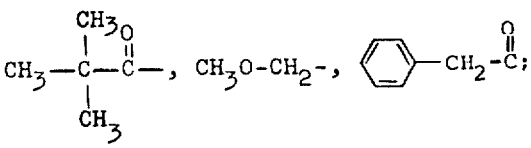

R⁵ is selected from the group comprising H, (lower)acyl, trichloroacetyl and cinnamoyl; R³ is H, CH$_3$, C$_2$H$_5$, N—C$_3$H$_7$, —CH$_2$—CH=CH$_2$, —CH$_2$—C ≡ CH; or a pharmaceutically acceptable acid addition salt thereof.

A more preferred embodiment is the compounds of formula XXXX wherein R¹ is —CH$_2$—C ≡ CH, —CH$_2$—CH=CH$_2$,

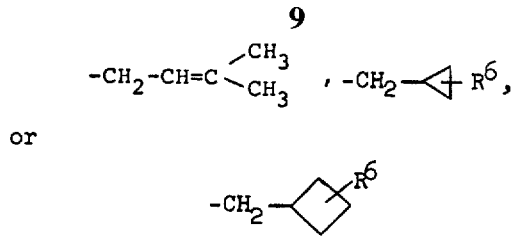

or in which R⁶ is H or CH₃, R² is H, CH₃,

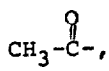

or

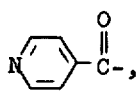

and R⁵ is H or acetyl, R³ is H, CH₃ or C₂H₅; or a pharmaceutically acceptable acid addition salt thereof.

Another more preferred embodiment is the compounds of formula XXXX wherein R¹ is

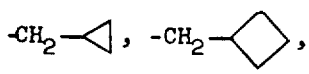

or —CH₂—CH=CH₂, R² is H, CH₃ or

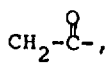

R₅ is hydrogen or acetyl, R³ is H or methyl; or a pharmaceutically acceptable acid addition salt thereof.

Most preferred embodiments are:

1. The compound of formula XXXX wherein R¹ is

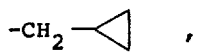

R² is H, R³ is H, and R⁵ is H; or the hydrochloric salt thereof.

2. The compounds of formula XXXX wherein R¹ is

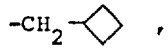

R² is H, R³ is CH₃, and R⁵ is H; or the hydrochloric salt thereof.

The processes for the preparation of the compounds of the instant invention are new and novel and also constitute preferred embodiments.

A preferred embodiment of the present invention is the process of preparing compounds having the formula

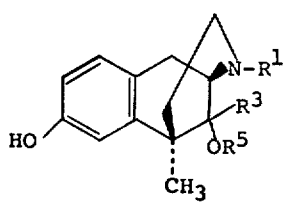

wherein R¹ is selected from the group comprising —CH₂—C ≡ CH, —CH₂—CH=CH,

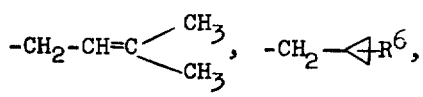

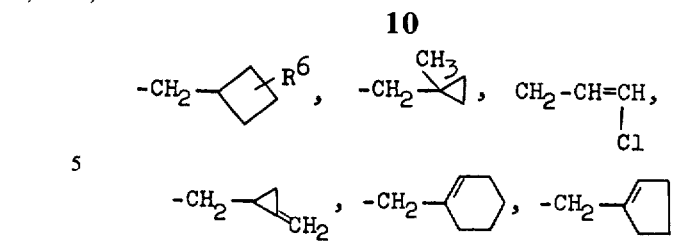

and C₃₋₇ alkenyl in which R⁶ is H or CH₃; R³ is H, CH₃ C₂H₅, N—C₃H₇, —CH₂—CH=CH₂ or —CH₂—C ≡ CH; R⁵ is H, (lower)acyl, trifluoroacetyl or cinnamoyl; which process comprises the consecutive steps of A. treating the compound having the formula

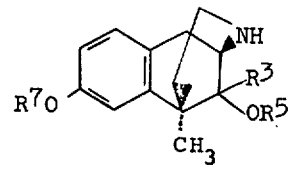

XXXXIII in which R⁷ is (lower)alkyl, R³ and R⁵ are as defined above, with an alkylating or acylating agent having the formula

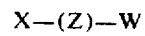

X—(Z)—W in which W is a radical selected from the group comprising —C ≡ CH, —CH=CH₂,

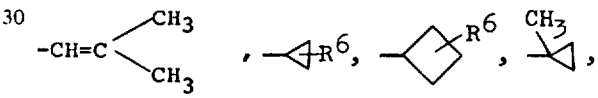

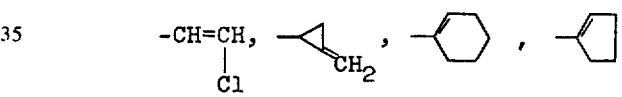

and C₂₋₆ alkenyl in which R⁶ is H or CH₃, Z is carbonyl

or —CH₂ — and X is chloro, bromo or iodo, in an inert organic solvent in the presence of an appropriate base to produce the compound having the formula

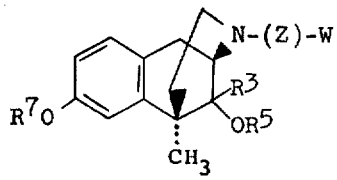

XXXXIV in which R⁷, R³, R⁵, Z and W are as defined above;

B. treating compound XXXXIV with lithium aluminum hydride when (Z) is carbonyl

in an inert organic solvent, to produce the compound having the formula

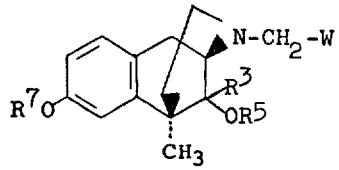

XXXXV in which $R^7$, $R^3$, $R^5$ and W are as defined above; and

C. cleaving the ether function of compound XXXXV or XXXXIV in which Z is —$CH_2$ — by treatment with an agent selected from the group comprising Na-S—$C_2H_5$, hydrobromic acid, boron tribromide or pyridine hydrochloride.

For the purpose of this disclosure, the term "inert organic solvent" means an organic solvent that does not participate in the reaction to the extent that it emerges unchanged from the reaction. Such solvents are methylene chloride, chloroform, dichloroethane, tetrachloromethane, benzene, toluene, ether, ethyl acetate, xylene, tetrahydrofuran, dioxane, dimethylacetamide, dimethylforamide, and the like when an acid halide is employed. When an alkylation reaction is being performed, the inert solvent used may also include (lower)alkanols such as methanol, ethanol, n-propanol, isopropanol and the like. The term "appropriate base" is an organic tertiary amine which is a tertiary amine commonly employed as a proton acceptor in acylation reactions. Such amines are tri(lower)alkylamines, e.g., trimethylamine, triethylamine, and the like, pyridine, dimethylaniline, N-methylpiperidine, and the like.

Another preferred embodiment is the process for preparing compounds having the formula

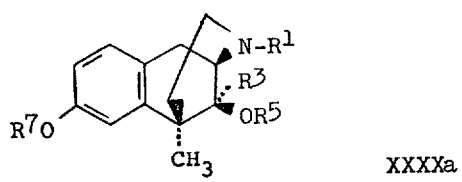

XXXXa wherein $R^1$ is selected from the group comprising —$CH_2$—C≡CH, —$CH_2$—CH=$CH_2$,

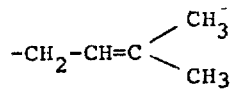

—$CH_2$—CH=CH, and $C_{3-7}$ alkenyl; $R^3$ is H, $CH_3$, $C_2H_5$, N—$C_3H_7$, —$CH_2$—CH=$CH_2$ or —$CH_2$—C≡CH, $R^5$ is H, (lower)acyl, trichloroacetyl or cinnamoyl, $R^7$ is H, which process comprises the consecutive steps of A. treating the compound having the formula

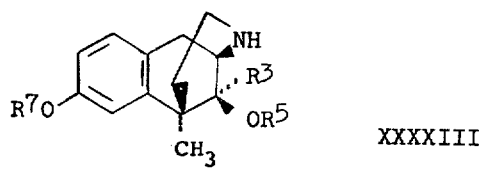

XXXXIII in which $R^7$ is (lower)alkyl and $R^3$ and $R^5$ are as defined above; with an alkylating agent having the formula $$R^1—X$$

in which $R^1$ is as above and X is chloro, bromo, or iodo, in an inert organic solvent in the presence of an appropriate base to produce the compound having the formula

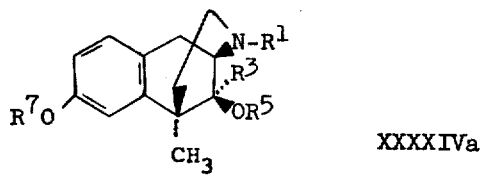

XXXXIVa in which $R^7$, $R^3$, $R^5$ and $R^1$ are as above; and

B. cleaving the ether function of compound XXXXIVa by treatment with NaS—$C_2H_5$, boron tribromide or pyridine hydrochloride.

All of the compounds of the preferred embodiments herein are novel and valuable for their properties as analgesic and/or narcotic antagonist agents, or as intermediates in the preparation of compounds having these biological activities.

In particular, the compounds having the formula XII are those which possess the most desirable properties; i.e., analgesic and/or narcotic antagonist properties. Some of these compounds also possess antitussive activity, a property generally inherent with analgetic activity.

It is well known in the narcotic analgesic prior art that it is possible for some compounds to possess both agonist and antagonist properties. An agonist is a compound that imitates a narcotic analgesic and possesses analgetic qualities. An antagonist is a compound that counteracts the analgetic and euphoric properties of a narcotic analgetic. It is possible for a compound to have both properties. A good example of such a compound is cyclazocine.

In vivo testing was conducted on the compounds designated herein as dl-XIIa, l-XIIa and dl-XIIc in the form of their respective soluble salts to determine their agonist and/or antagonist properties. Table I represents the results of the experiments. The figures reported are the number of milligrams/kilogram of body weight of compound that produced an agonist or antagonist effect in 50% of the mice and rats so tested ($ED_{50}$).

TABLE I $ED_{50}$ (mg./kg.)[a]

| | Agonist Activity | | | | Antagonist Activity | | | |
|---|---|---|---|---|---|---|---|---|
| | Mouse Phenylquinone[1] Writhing | | Oxymorphone[2] Straub Tail | | Oxymorphone[3] Narcosis | | Morphine Antagonism[4] Rat Tail Flick | |
| Test Compounds | SC | PO | SC | PO | SC | PO | SC | PO |
| dl-XIIa | 0.62 | 3.2 | ~1.5 | N.D. | N.D. | N.D. | 0.26 | N.D. |
| l-XIIa | 0.11 | N.D.[5] | 0.60 | N.D. | 0.15 | N.D. | 0.104 | N.D. |
| dl-XIIc | 0.30 | N.D. | 1.01 | N.D. | ~0.1 | N.D. | 0.22 | N.D. |

TABLE 1—Continued

ED$_{50}$ (mg./kg.)[6]

| | Agonist Activity | | Antagonist Activity | | | | | |
|---|---|---|---|---|---|---|---|---|
| | Mouse Phenylquinone[1] Writhing | | Oxymorphone[2] Straub Tail | | Oxymorphone[3] Narcosis | | Morphine Antagonism[4] Rat Tail Flick | |
| Test Compounds | SC | PO | SC | PO | SC | PO | SC | PO |
| Pentazocine | 4.9 | 36 | 12.0 | 187 | 10.1 | 90 | 12.2 | 82.2 |
| Nalorphine | 0.77 | 15 | 1.14 | >64 | 0.58 | 5.4 | 0.38 | 22.1 |
| Levallorphan | 26.3 (poor dose response) | N.D. | 0.29 | 46 | 0.32 | 5.4 | 0.086 | 12.6 |
| Cyclazocine | 0.047 | 40 | 0.81 | 24 | 0.12 | 2.7 | 0.040 | 3.7 |
| Naloxone | 40 | N.D. | 0.17 | 13.1 | 0.02 | 0.95 | 0.010 | 2.7 |

[1] A 50 per cent reduction in number of phenylquinone induced writhings (Siegmund, E. A. et al., Proc. Soc. Biol. & Med. *95*, 729; 1957).
[2] Antagonism of Straub Tail induced by oxymorphone (2 mg./kg. sc.) in 50 per cent of mice.
[3] Antagonism of righting reflex loss induced by oxymorphone (1.5 mg./kg. sc.) in 50 per cent of rats.
[4] A 50 per cent reduction of analgesic effect induced by morphine (15 mg./kg. sc.) as measured by the rat tail flick procedure (Harris, L. S. and Pierson, A. K., J. Pharmacol. & Expt. Therap., *143*, 141; 1964).
[5] N.D.—Not done.
[6] All weights reported are corrected to read in terms of the free base.

It is apparent from the testing that the compounds have potent agonist and antagonist activity. The normal parenteral dosage range of the compounds of the present invention in adult humans is about 0.25 to 10 mg. three to four times a day. Orally the dose is in the range of about 2 to 50 mg. three or four times a day.

It has been reported in the literature that the compound haloperidol, 4[4-(p-chlorophenyl)-4-hydroxypiperidino]-4'-fluorobutyrophenone (Merck Index, 8th Edition, p. 515) has found some experimental use in the alleviation of narcotic addiction withdrawal symptoms. It is therefore a preferred embodiment of the present invention to combine haloperidol with the narcotic antagonists of the instant invention to produce a product not only preventing narcotic abuse, but at the same time providing supportive therapy in the absence of opiates.

Haloperidol is commonly administered orally in 0.5 to 5.0 mg. two or three times daily depending upon the severity of the illness. A dose of haloperidol in this range would be administered contemporaneously with an effective dose of the narcotic antagonist to produce the desired result.

Other combinations would include the narcotic antagonists in combination with anti-anxiety agents such as chlordiazepoxide and diazepam, or phenothiazines like chlorpromazine, promazine or methotrimeprazine.

EXAMPLE 1

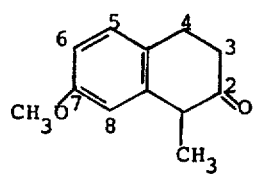

3,4-Dihydro-7-methoxy-1-methyl-2(1H)naphthalenone (II)

To a stirred solution of 50 g. (0.284 mole) of Ia (3,4-dihydro-7-methoxy-2(1H)naphthalenone) dissolved in 200 ml. of dry benzene was added during 5–10 minutes and under nitrogen, 40.5 g. (0.5 mole) of pyrrolidine dissolved in 50 ml. of benzene. The mixture was refluxed for one hour and 5 ml. of water was collected in a Dean-Stark apparatus. The mixture was cooled and added slowly to 0.5 mole of methyl iodide dissolved in 300 ml. of benzene. The resulting mixture was refluxed for 3 hours. Then 200 ml. of water was added to the reaction and refluxing was resumed. After 30 minutes the mixture was cooled, the benzene layer was separated, washed with water, followed by water saturated with sodium sulfate and evaporated to dryness. The residue was distilled to give II. The infrared (IR) and Nuclear Magnetic Resonance (NMR) spectra were consistent with the structure.

EXAMPLE 2

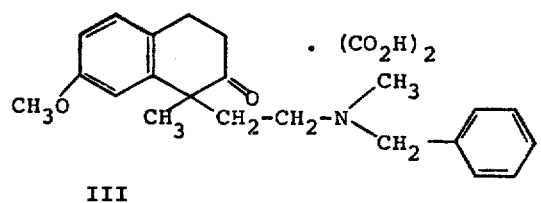

1-(2-Benzylmethylaminoethyl)-7-methoxy-1-methyl-3,4-dihydro-2(1H)naphthalenone hydrogen oxalate (III)

A solution of 7-methoxy-1-methyl-3,42(1H)naphthalenone (0.12 m) II in benzene (40 ml) was added to a refluxing suspension of sodium hydride (0.14 m) in benzene (100 ml). After one hour reflux, this mixture was treated with a solution of 2-benzylmethylaminoethylchloride (0.12 m) in benzene (100 ml) and heated at reflux for 18 hrs. The reaction mixture was washed with water, then extracted into dilute hydrochloric acid. Neutralization of the acid extract with ammonium hydroxide and extraction with ether afforded an oil which was converted to an oxalate salt (78%); mp 137°–139°C.

Anal. calcd. for $C_{22}H_{27}NO_2 \cdot C_2H_2O_4$: C, 67.43; H, 6.84; N, 3.28.

Found: C, 67.25; H, 7.05; N, 3.50.

EXAMPLE 3

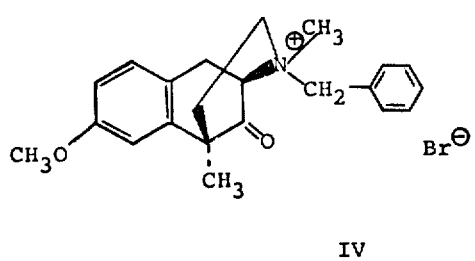

IV

2-Benzyl-2'-methoxy-5-methyl-9-oxo-6,7-benzomorphan methobromide (IV)

Compound III was converted to its hydrobromide salt by treatment with sodium hydroxide solution, isolation by extraction with ether and subsequent treatment with HBr. This hydrobromide salt (0.21 m) was dissolved in 450 ml acetic acid and slowly treated with a solution of bromine (11,2 ml) in 50 ml acetic acid and stirred for one-half hr. This was diluted with two liters of "Skellysolve B" (essentially n-hexane) and cooled under nitrogen. The Skellysolve B layer was decanted from the gummy precipitate. This residue was partitioned between ether and water. This two phase system was basified with conc. ammonium hydroxide. The layers were immediately separated and the aqueous layer extracted with ether. Concentration of the ether extracts gave an oil. This oil was taken up in acetone and stirred several hours to give IV as a crystalline solid (76%).

EXAMPLE 4

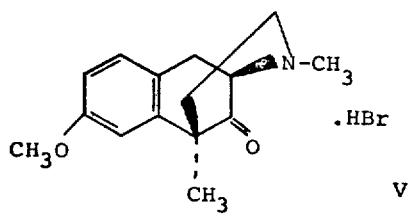

2,5-Dimethyl-2'-methoxy-9-oxo-6,7-benzomorphan (V)

Reduction of IV in acetic acid using hydrogen and 10% palladium on carbon produced compound V in 92% yield; m.p. 145°–149°C. This compound is a known compound [E. L. May and co-worker, J. Org. Chem., 25, 1386 (1960)]. This synthesis represents an improved process for the preparation of these compounds.

EXAMPLE 5

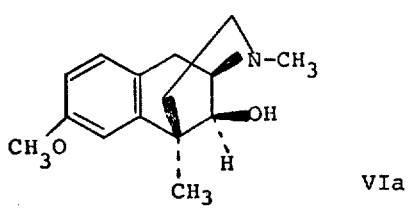

2,5-Dimethyl-9β-hydroxy-2'-methoxy-6,7-benzomorphan hydrobromide (VIa)

A suspension of IV (0.04 m) in 200 ml ether was treated with 50 ml of a 2.5 m solution of isopropyl magnesium chloride in tetrahydrofuran. This mixture was stirred under nitrogen for 17 hours. The cooled mixture was slowly treated with water (200 ml) and conc. hydrobromic acid (25 ml). The ether was removed by evaporation at reduced pressure. Extraction of the aqueous mixture with methylene chloride gave a tan foam (17 g). This foam was taken up in 95% ethanol (200 ml) and hydrogenated on a Parr shaker using palladium hydroxide on carbon as catalyst to give 10.3 g. (78%) pure VIa after crystallization from 2-propanol.

EXAMPLE 6

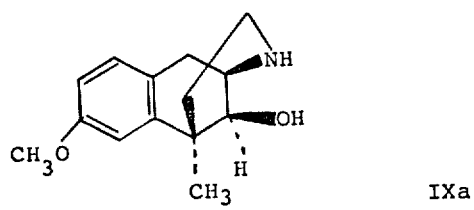

5-Methyl-9β-hydroxy-2'-methoxy-6,7-benzomorphan (IXa)

A mixture of VIa free base (0.031 m) and 90 ml acetic anhydride was heated at 100° for 1 hour. The acetic anhydride was removed at reduced pressure. Treatment of the residue with sodium carbonate and extraction with methylene chloride afforded a quantitative yield of 2,4-dimethyl-2'-methoxy-9β-hydroxy-6,7benzomorphan 9β-acetate. This material was taken up in benzene (100 ml) and treated with potassium carbonate (5 g) and ethyl chloroformate (10 ml). This mixture was heated at reflux under nitrogen for 26 hrs. This mixture was treated with water. The benzene layer was separated and washed with dilute hydrochloric acid and saturated sodium chloride to afford after concentration a quantitative yield of 5-methyl-2'-methoxy-2-carbethoxy-9β-hydroxy-6,7 benzomorphan 9β-acetate. This material was taken up in 95% ethanol (250 ml) and treated with 30 g potassium hydroxide. This was heated at reflux under nitrogen for 90 hours. The ethanol was removed at reduced pressure. Treatment of the residue with 10% sodium bicarbonate and extraction with methylene chloride afforded 7.2 g. IXa (100%). Recrystallization from toluene gave analytically pure material (6.8 g — 94%); mp 132.0°–133.5° Anal. calc'd. for $C_{14}H_{19}NO_2$: C, 72.07; H, 8.21; N, 6.00. Found: C, 72.08; H, 8.03; N, 6.08.

EXAMPLE 7

2,5-Dimethyl-9-(spiro-β-epoxy)-2'-methoxy-6,7-benzomorphan (XX)

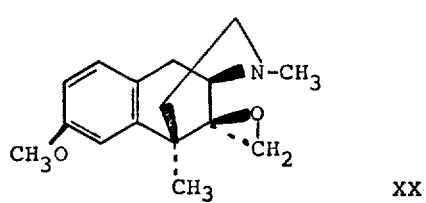

A solution of 2,5-dimethyl-2'-methoxy-9-oxo-6,7-benzomorphan (V) (0.05 m) in 125 ml dry dimethylsulfoxide was added to a 55% sodium hydride dispersion (0.1 m) with stirring under nitrogen. To this mixture was added trimethyl-sulfonium iodide (0.1 m) with stirring. After stirring for 4 hrs. under nitrogen, the mixture was diluted with water and extracted with methylene chloride. Drying and concentration of these extracts gave an oil which vpc analysis indicated to contain 87% β-isomer (XX), 6–7% of another product believed to be α-isomer and some starting ketone. Chromatography on alumina followed by crystallization from cyclohexane gave pure XX (64% yield of >95% isomer purity); mp 93°–95°C.

Anal. calc'd. for $C_{16}H_{21}NO_2$: C, 74.10; H, 8.16; N, 5.40. Found: C, 73.89; H, 8.30; N, 5.36.

EXAMPLE 8

9β-Hydroxy-2'-methoxy-2,5,9α-trimethyl-6,7-benzomorphan hydrochloride (VIb)

A solution of 2,5-dimethyl-9-(spiro-β-epoxy)-2-methoxy-6,7-benzomorphan (XX) (0.028 m) in 75 ml tetrahydrofuran was added to a stirred suspension of lithium aluminum hydride (0.045 m) in 25 ml tetrahydrofuran (THF). This mixture was stirred at 25°C for 16 hrs. and heated at reflux for 2 hrs. This mixture was cautiously treated with 5 ml saturated sodium sulfate. The solids were removed by filtration and the filtrates concentrated to dryness. The residual oil was converted to a hydrochloride and crystallized from ethanol-ethyl acetate-water to give pure VIb hydrochloride hydrate (86% yield); mp 139.0–143.0 C. Vpc (vapor phase chromatography) analysis on the free base indicated an isomer purity of >96%. Solution infrated spectra (CCl₄) at different concentrations shows only bonded OH indicating the β-OH configuration.

EXAMPLE 9

Preparation of
9β-Acetoxy-2-carbethoxy-5,9α-dimethyl-2'-methoxy-6,7-benzomorphan (VIIIb)

9β-Hydroxy-2'-methoxy-2,5,9α-trimethyl-6,7-benzomorphan (VIb) (0.022 m) was treated with 50 ml acetic anhydride and heated on a steam bath for 3 hr. After removal of the acetic anhydride at reduced pressure, the residue was treated with dilute sodium carbonate and extracted with benzene. Drying and evaporation of the benzene extracts yielded the acetoxy compound 9β-acetoxy-2,5,9α-trimethyl-2'-methoxy-6,7-benzomorphan (VIIb). A solution of this material in benzene was treated with 2.5 g potassium carbonate and 6.5 ml ethyl chloroformate (0.07 m) and heated at reflux for 16 hr. This mixture was cautiously treated with 120 ml 1N hydrochloric acid. The layers were separated and the aqueous layer was extracted with benzene. Drying and concentration of the combined benzene extracts gave title product (VIIIb) which was recrystallized from 95% ethanol; mp 87.5°–88.5°C.

Anal. calc'd. for $C_{20}H_{27}NO_5$: C, 66.46 H, 7.53; N, 3.88. Found: C, 66.18; H, 7.62; N, 3.75.

EXAMPLE 10

Preparation of
5,9α-Dimethyl-9β-hydroxy-2'-methoxy-6,7-benzomorphan (IXb).

A mixture of 9β-acetoxy-2-carbethoxy-5,9α-dimethyl-2'-methoxy-6,7-benzomorphan (VIIIb). (0.002 m), 2.5 g potassium hydroxide and 20 ml 95% ethanol was heated at reflux for 18 hr. After concentration, the residue was treated with water and extracted with methylene chloride to give the title product IXb which was recrystallized from ethyl acetate; mp 147.0°–148.0°C.

Anal. calc'd. for $C_{15}H_{21}NO_2$: C, 72.84 H, 8.56; N, 5.66. C, 73.12; H, 8.63; N, 5.82.

EXAMPLE 11

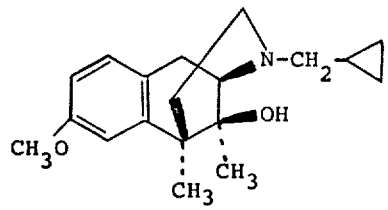

2-Cyclopropylmethyl-5,9α-dimethyl-9β-hydroxy-2'-methoxy-6,7-benzomorphan XIb

A solution of 5,9-α-dimethyl-11β-hydroxy-2'-methoxy-6,7-benzomorphan (IXb) (0.005 m) in 25 ml methylene chloride and 7.5 ml triethylamine was treated with cyclopropylcarbonyl chloride (3 ml) with stirring. This mixture was stirred for 18 hours and then treated with dilute sodium carbonate. The layers were separated and the aqueous layer extracted with methylene chloride. Drying and concentration of the methylene chloride extracts gave 2-cyclopropylcarbonyl-5,9α-dimethyl-9β-hydroxy-2'-methoxy-6,7-benzomorphan (Xb) as an oil. This material was taken up in tetrahydrofuran (30 ml) and added to a stirred suspension of lithium aluminum hydride (1.0g) in tetrahydrofuran (20 ml). After an 18 hour reflux period, this mixture was cautiously treated with 3 ml saturated sodium sulfate and warmed until solids were white. Removal of the solids by filtration and concentration of the filtrates gave an oil (XIb) which was converted to its hydrobromide salt; mp 242°–244°C.

Anal. calc'd. for $C_{19}H_{27}NO_2.HBr$: C, 59.68; H, 7.38; N, 3.66.
Found: C, 59.31; H, 7.52; N, 3.35.

EXAMPLE 12

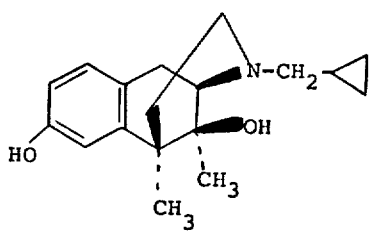

2-Cyclopropylmethyl-5,9α-dimethyl-2',9β-dihydroxy-6,7-benzomorphan hydrogen fumarate (XIIb)

2-Cyclopropylmethyl-5,9α-dimethyl-9β-hydroxy-2'-methoxy-6,7-benzomorphan hydrobromide (XIb) (0.0013 m) was treated with 10 ml 48% hydrobromic acid and heated in an oil bath at 130°–133°C under nitrogen for 20 minutes. This was cooled, basified with ammonium hydroxide and extracted with methylene chloride to give a tan foam which was converted to a crystalline fumarate in ethanol-ethyl acetate; mp 228°–235°C (decomp).

Anal. calc'd. for $C_{18}H_{25}NO \cdot 2C_4H_4O_4$: C, 65.49; H, 7.24; N, 3.47.

Found: C, 65.34; H, 7.10; N, 3.44.

EXAMPLE 13

2-Cyclopropylmethyl-11β-hydroxy-2'-methoxy-5-methyl-6,7-benzomorphan hydrobromide (XIa)

Substitution in the procedure of example 11 for the 5,9α-dimethyl-11β-hydroxy-2'-methoxy-6,7-benzomorphan used therein of an equimolar quantity of 9β-hydroxy-5-methyl-2'-methoxy-6,7-benzomorphan produced the title compound XIa; m.p. 199°–200.5° C.

Anal. calc'd. for $C_{18}H_{25}NO_2 \cdot HBr$: C, 58.69; H, 7.12; N, 3.80.

Found: C, 58.76; H, 7.21; N, 3.72.

EXAMPLE 14

2-Cyclopropylmethyl-2',9β-dihydroxy-5-methyl-6,7-benzomorphan (dl-XIIa)

A solution of sodium thioethoxide (0.04 mole) and the free base of XIa (0.0022 mole) in 30 ml DMF (dimethylformamide) was heated at reflux under nitrogen for three hours. The DMF was removed at reduced pressure. The residue was treated with toluene and extracted with dilute hydrochloric acid. The acid extracts were made basic with sodium carbonate and extracted with methylene chloride to give an oil which glc (gas-liquid chromatography) indicated to be about 60% product. Formation of the hydrochloride and several crystallizations from 95% ethanol gave pure XIIa hydrochloride; mp 235°–240°C. decomp.

Anal. calc'd. for $C_{17}H_{23}NO_2 \cdot HCl$: C, 65.90; H, 7.81; N, 4.52.

Found: C, 65.75; H, 8.17; N, 4.67.

EXAMPLE 15

Resolution of dl-XIa into l-2-cyclopropylmethyl-9β-hydroxy-2'-methoxy-5-methyl-6,7-benzomorphan (+) tartrate (l-XIa tartrate)

A mixture of dl-XIa (0.0087 mole) and (+) tartrate acid (1.4g) was dissolved in hot ethanol (20 ml) and then cooled for crystallization. The crystals were collected and recrystallized from 15 ml ethanol to give pure l-XIa tartrate; mp 151°–152°C; $[\alpha]_D$ $^{25}$-56° and $[\alpha]_{436}$ $^{25}$ (Hg) -119°(C 0.99, 95% ethanol).

Anal. calc'd. for $C_{18}H_{25}NO_2 \cdot C_4H_6O_6$: C, 60.40; H, 7.14; N, 3.20.

Found: C, 60.01; H, 7.46; N, 3.21.

EXAMPLE 16 l-2-Cyclopropylmethyl-2;9β-dihydroxy-5-methyl-6,7-benzomorphan hydrochloride (l-XIIa)

A solution of sodium thioethoxide (0.06 mole) and free base of l-XIa tartrate (0.0034 mole) in DMF (35 ml) was heated at reflux for 3 hours. After removal of the DMF, the residue was treated with toluene and extracted with dilute hydrochloric acid. These acid extracts were basified with sodium carbonate and extracted with methylene chloride to give an oil with glc indicated to be about 63% product. This material was purified by chromatography on silica gel with ethyl acetate as solvent. Formation of the hydrochloride and recrystallization from 95% ethanol afforded pure l-XIIa HCl; mp 247°–252°C decomp.; $[\alpha]_D$ $^{24}$-100° and $[\alpha]_{436}$ $^{24}$(Hg)—208° (C 0.921, 95% ethanol).

Anal. calc'd. for $C_{17}H_{23}NO_2 \cdot HCl$: C, 65.90; H, 7.81; N, 4.52.

Found: C, 65.78; H, 8.09; N, 4.66.

EXAMPLE 17

2-Cyclobutylmethyl-5,9α-dimethyl-9β-hydroxy-2'-methoxy-6,7-benzomorphan (XIc)

Substitution in the procedure of example 11 for the cyclopropylcarbonyl chloride used therein of an equimolar quantity of cyclobutylcarbonyl chloride produced the title compound XIc; m.p. 225°–229°C.

Anal. calc'd. for $C_{20}H_{29}NO_2 \cdot HBr$: C, 60.60; H, 7.63; N, 3.53.

Found: C, 60.72; H, 7.76; N, 3.43.

EXAMPLE 18

2-Cyclobutylmethyl-5,9α-dimethyl-2',9β-dihydroxy-6,7-benzomorphan hydrochloride hydrate (XIIc)

Substitution in the procedure of example 12 for the compound XIb and fumaric acid used therein of equimolar quantities of compound XIc and dry HCl gas produced the title compound XIIc; m.p. 149.5°–154.5°C.

Anal. calc'd. for $C_{19}H_{27}NO_2 \cdot HCl \cdot H_2O$: C, 64.12; H, 8.50; N, 3.94.

Found: C, 64.17; H, 8.47; N, 3.91.

EXAMPLE 19

2-Cyclobutylmethyl-9β-hydroxy-2'-methoxy-5-methyl-6,7-benzomorphan hydrobromide (XId)

Substitution in the procedure of example 11 for the cyclopropylcarbonyl chloride and compound IXb used therein of equimolar quantities of cyclobutylcarbonyl chloride and compound IXa produced the title compound XId; m.p. 227.5°–229.5°C.

Anal. calc'd. for $C_{19}H_{27}NO_2 \cdot HBr$: C, 59.68; H, 7.38; N, 3.66.

Found: C, 59.72; H, 7.15; N, 3.57.

EXAMPLE 20

2-Cyclobutylmethyl-2',9β-dihydroxy-5-methyl-6,7-benzomorphan hydrobromide (XIId)

Substitution in the procedure of example 12 for the compound XIb used therein of an equimolar quantity of compound XId produced the title compound XIId; m.p. 252°–258°C.

Anal. calc'd. for $C_{18}H_{25}NO_2 \cdot HBr$: C, 58.69; H, 7.12; N, 3.80.

Found: C, 58.74; H, 7.24; N, 3.72.

EXAMPLE 21

2-Allyl-2',9β-dihydroxy-5-methyl-6,7-benzomorphan-hydrobromide (XIIe)

Substitution in the procedure of example 12 for the compound XIb therein of an equimolar quantity of compound XIe produced the title product XIIe; m.p. 231°–234°C.

Anal. calc'd. for $C_{16}H_{21}NO_2 \cdot HBr$: C, 56.47; H, 6.52; N, 4.12.

Found: C, 56.20; H, 6.50; N, 3.81.

EXAMPLE 22

2.5-Dimethyl-9α-ethyl-9β-hydroxy-2'-methoxy-6,7-benzomorphan fumarate (VIf)

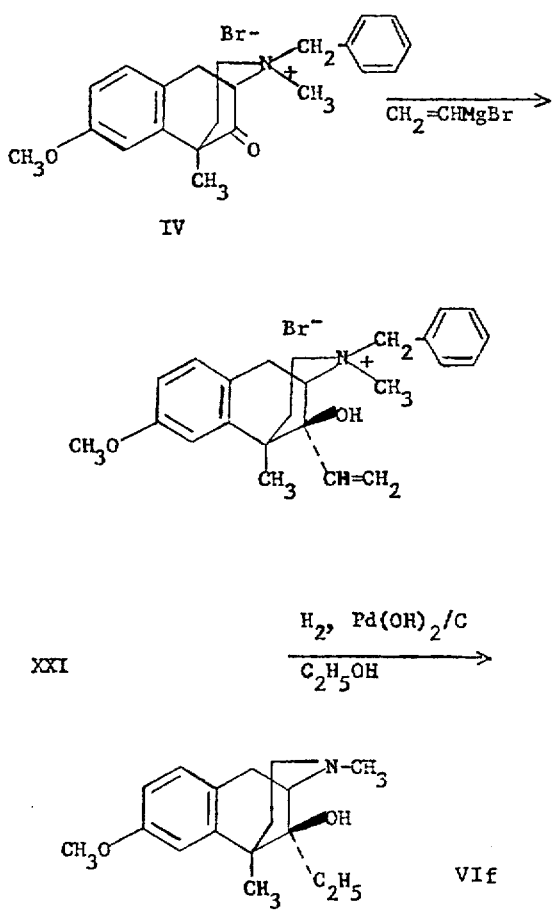

A suspension of IV (0.025 mole) in THF (50 ml) was treated with a solution of vinyl magnesium bromide (0.075 mole) in the THF (80 ml). This mixture was stirred for 20 hours. The reaction mixture was treated with saturated ammonium chloride solution (100 ml). The layers were separated and the aqueous layer extracted with THF. The THF extracts were washed with saturated sodium chloride, dried and concentrated to give XXI (11.2 g) as a viscous oil. This oil was hydrogenated in ethanol using Pd(OH)$_2$/C as catalyst to give VIf. The fumarate salt was prepared and crystallized from n-propanol; mp 175°–176°C.

Anal. calc'd. for $C_{17}H_{25}NO_2 \cdot \frac{1}{2}C_4H_4O_4$: C, 68.44; H, 8.16; N, 4.20.

Found: C, 67.53; H, 8.23; N, 4.08; H$_2$O, 0.96.

EXAMPLE 23

9α-Ethyl-9β-hydroxy-2'-methoxy-5-methyl-6,7-benzomorphan hydrobromide (IXf)

Substitution in the procedure of example 6 for the compound VIa used therein of an equimolar quantity of compound VIf produced compound IXf; m.p. 168°–169°C.

Anal. calc'd. for $C_{16}H_{23}NO_2 \cdot HBr$: C, 56.14; H, 7.07; N, 4.09.

Found: C, 56.11; H, 7.11; N, 4.18.

EXAMPLE 24

2-Allyl-9α-ethyl-9β-hydroxy-2'-methoxy-5-methyl-6,7benzomorphan hydrogen fumarate (XIf)

Substitution in the procedure of example 50 for the compound IXa and acetonitrile used therein of equimolar quantities of compound IXf and ethanol produced the title product XIf; m.p. 123.5°–125.5°C.

Anal. calc'd. for $C_{19}H_{27}NO_2 \cdot C_4H_4O_4$: C, 66.16; H, 7.48; N, 3.36.

Found: C, 66.34; H, 7.83; N, 3.17.

EXAMPLE 25

2-allyl-9α-ethyl-2',9β-dihydroxy-5-methyl-6,7-benzomorphan fumarate (XIIf)

Substitution in the procedure of example 14 for the compound XIa used therein of an equimolar quantity of compound XIf produced the title compound XIIf; m.p. 252°–257° (decomp.).

Anal. calc'd. for $C_{18}H_{25}NO_2 \cdot \frac{1}{2}C_4H_4O_4$: C, 69.54; H, 7.88; N 3.82.

Found: C, 69.42; H, 8.08; N, 3.82.

EXAMPLE 26

2-Cyclopropylmethyl-9α-ethyl-9β-hydroxy-2'-methoxy-5-methyl-6,7-benzomorphan hydrogen fumarate (XIg).

Substitution in the procedure of example 11 for the compound IXb used therein of an equimolar quantity of IXf produced the title compound XIg as the hydrogen fumarate containing one-half mole of n-propanol; m.p. 143°–144°C.

Anal. calc'd. for $C_{20}H_{29}NO_2 \cdot C_4H_4O_4 \cdot \frac{1}{2}C_3H_8O$: 66.55; 66.55; H, 8.08; N, 3.03.

Found: C, 66.38; H, 8.02; N, 2.87.

EXAMPLE 27

2-cyclopropylmethyl-9α-ethyl-2,9β-dihydroxy-5-methyl-6,7-benzmorphan hydrogen fumarate (XIIg)

Substitution in the procedure of example 14 for the compound XIa used therein of an equimolar quantity of XIg produced the title compound XIIg; m.p. 245°–253°C. (decomp.).

Anal. calc'd. for $C_{19}H_{27}NO_2 \cdot C_4H_4O_4$: C, 66.16; H, 7.48; N, 3.36.

Found: C, 65.94; H, 7.73; N, 3.31.

EXAMPLE 28

2-Cyclobutylmethyl-9α-ethyl-9β-hydroxy-2'-methoxy-5-methyl-6,7-benzomorphan hydrogen fumarate (XIh)

Substitution in the procedure of example 11 for the compound IXb and cyclopropylcarbonyl chloride used therein of equimolar quantities of compound IXf and cyclobutylcarbonyl chloride produced the title compound XIh in 89% yield; m.p. 138°–141°C.

Anal. calc'd for $C_{21}H_{31}NO_2 \cdot C_4H_4O_4$: C, 67.39; H, 7.92; N, 3.14.

Found: C, 67.20; H, 8.06; N, 2.97.

EXAMPLE 29

2-Cyclobutylmethyl-9α-ethyl-2',9β-dihydroxy-5-methyl-6,7-benzomorphan fumarate (XIIh)

Substitution in the procedure of example 14 for the compound XIa used therein of an equimolar quantity of compound XIh produced the title compound XIIh in 81% yield; m.p. 235°–241°C.
Anal. calc'd. for $C_{20}H_{29}NO_2 \cdot \frac{1}{2}C_4H_4O_3$: C, 70.75; H, 8.37; N, 3.75.
Found: C, 70.96; H, 8.62; N, 3.56.

EXAMPLE 30

3,4-Dihydro-7-methoxy-1-methyl-1(2,2-dimethylaminoethyl)-2[1H]naphthalenone hydrobromide (IIIa)

Substitution in the proceudre of example 2 for the 2-benzyl-2-methylaminoethylchloride used therein of an equimolar quantity of 2,2-dimethylaminoethyl chloride produced the title compound IIIa.

EXAMPLE 31

2,5-Dimethyl-2'-methoxy-9-oxo-6,7-benzomorphan methobromide (IVa)

Substitution in the procedure of example 3 for the compound III used therein of an equimolar quantity of compound IIIa obtained in example 2 produced the title product IVa.

EXAMPLE 32

9α-allyl-2'-methoxy-2,5-dimethyl-9β-hydroxy-6,7-benzomorphan methobromide (XXIa)

Substitution in the procedure of example 22 for the compound IV and the vinylmagnesium bromide used therein of equimolar quantities of compound IVa and allyl magnesium bromide produced the title compound XXIa.

EXAMPLE 33

9α-allyl-2'-methoxy-2,5-dimethyl-9β-hydroxy-6,7-benzomorphan (VIk)

Five grams of compound XXIa was dissolved in boiling 1-octanol and refluxed for 15–20 minutes. After cooling, the solution was diluted with ether and extracted with 2N HCl followed by two portions of water. The aqueous phase was washed with n-hexane, basified with ammonium hydroxide, extracted with ether, stirred over sodium carbonate and evaporated. The residue crystallized upon the addition of cyclohexane and was the desired title product VIk.

EXAMPLE 34

9α-Allyl-9β-hydroxy-5-methyl-2'-methoxy-6,7-benzamorphan hydrogen fumarate (IXk)

Substitution in the procedure of example 6 for the compound VIa used therein of an equimolar quantity of VIk produced the title product IXk; m.p. 159°–162°C.
Anal. calc'd. for $C_{17}H_{23}NO_2 \cdot C_4H_4O_4$: C, 64.76; H, 6.94; N, 3.60.
Found: C, 64.11; H, 7.23; N, 3.57; $H_2O$, 0.55.

EXAMPLE 35

2,9α-Diallyl-9β-hydroxy-2'-methoxy-5-methyl-6,7-benzomorphan hydrogen fumarate (XIk)

Substitution in the procedure of example 50 for the compound IXa and acetonitrile used therein of an equimolar quantity of compound IXk and ethanol produced the title compound XIk in 90% yield; m.p. 132°–135°C.
Anal. calc'd. for $C_{20}H_{27}NO_2 \cdot C_4H_4O_4$: C, 67.11; H, 7.28;. N, 3.26.
Found: C, 66.97; H, 7.48; N, 3.39.

EXAMPLE 36

2,9α-Diallyl-2',9β-dihydroxy-5-methyl-6,7-benzomorphan hydrogen fumarate (XIIk).

Substitution in the procedure of example 14 for the compound XIa used therein of an equimolar quantity of compound XIk produced the title product XIIk in 69% yield; m.p. 217°–223°C. (decomp.).
Anal. calc'd. for $C_{19}H_{25}NO_2 \cdot C_4H_4O_4$: C, 66.49; H, 7.04; N, 3.37.
Found: C, 65.57; H, 7.19; N, 3.18; $H_2O$, 0.85.

EXAMPLE 37

9α-allyl-2-cyclobutylmethyl-9β-hydroxy-2'-methoxy-5-methyl-6,7-benzomorphan hydrogen fumarate (XIj)

Substitution in the procedure of example 11 for the compound IXb and cyclopropylcarbonyl chloride used therein of an equimolar quantity of compound IXk and cyclobutylcarbonyl chloride produced the title compound XIj in 89% yield; 179°–180°C.
Anal. calc'd. for $C_{22}H_{31}NO_2 \cdot C_4H_4O_4$: C, 68.25; H, 7.71; N, 3.06.
Found: C, 67.85, H, 7.79; N, 2.97.

EXAMPLE 38

9α-Allyl-2-cyclobutylmethyl-2',9β-dihydroxy-5-methyl-6,7-benzomorphan (XIIj)

Substitution in the procedure of example 14 for the compound XIa used therein of an equimolar quantity of XIj produced the title compound in 88% yield; m.p. 203°–204°C.
Anal. calc'd. for $C_{21}H_{29}NO_2 \cdot C_4H_4O_4$: C, 67.70; H, 7.50; N, 3.16.
Found: C, 67.42; H, 7.72; N, 3.51.

EXAMPLE 39

9α-Allyl-2-cyclopropylmethyl-9β-hydroxy-2'-methoxy-5-methyl-6,7-benzomorphan hydrogen fumarate (XIm)

Substitution in the procedure of example 11 for the compound IXb used therein of an equimolar quantity of compound IXk produced the title compound XIm in 76% yield; m.p. 139°–141°C.
Anal. calc'd. for $C_{21}H_{29}NO_2 \cdot C_4H_4O_4$: C, 67.70; H, 7.50; N, 3.16.
Found: C, 67.61; H, 7.50; N, 3.16

EXAMPLE 40

9α-Allyl-2-cyclopropylmethyl-2',9β-dihydroxy-5-methyl-6,7-benzomorphan hydrogen fumarate (XIIm)

Substitution in the procedure of example 14 for the compound XIa used therein of an equimolar quantity of XIm produced the title product XIIm in 87% yield; m.p. 235°–241°C.
Anal. calc'd. for $C_{20}H_{27}NO_2 \cdot C_4H_4O_4$: C, 67.11; H, 7.28; N, 3.26.
Found: C, 66.75; H, 7.55; N, 3.19

EXAMPLE 41

9β-Hydroxy-2'-methoxy-5-methyl-9α-propyl-6,7-benzomorphan hydrogen fumarate (IXn)

Hydrogenation of IXk using 5% Pd/C as a catalyst in ethanol produced the title product as the hydrogen fumarate IXn in a yield of 95%; m.p. 177°–183°C.

Anal. calc'd. for $C_{17}H_{23}NO_2 \cdot C_4H_4O_4$: C, 64.43; H, 7.47; N, 3.58.
Found: C, 64.16; H, 7.46; N, 3.42.

EXAMPLE 42

2-Allyl-9β-hydroxy-2'-methoxy-5-methyl-9α-propyl-6,7-benzomorphan hydrogen fumarate (XIn)

Substitution in the procedure of example 24 for the compound IXf used therein of an equimolar quantity of compound IXn produced the title compound XIn in 80% yield; m.p. 165°–166°C.

Anal. calc'd. for $C_{20}H_{29}NO_2 \cdot C_4H_4O_4$: C, 66.80; H, 7.71; N, 3.25. Found: C, 66.49; H, 7.91; N, 3.23.

EXAMPLE 43

2-Allyl-2', 9β-dihydroxy-5-methyl-9α-propyl-6,7-benzomorphan hydrogen fumarate (XIIn)

Substitution in the procedure of example 14 for the compound XIa used therein of an equimolar quantity of compound XIn produced in 66% yield the title compound XIIn; m.p. 215°–222°C.

Anal. calc'd. for $C_{19}H_{27}NO_2 \cdot C_4H_4O_4$: C, 66.16; H, 7.48; N, 3.36.
Found: C, 65.81; H, 7.72; N, 3.40.

EXAMPLE 44 l-2-Cyclopropylmethyl-2',9β-dihydroxy-5-methyl-6,7-benzomorphan diacetate l-XIIa free base (0.001 mole) was dissolved in 2 ml of acetic anhydride and 0.16 g of pyridine and refluxed for 1 hour. The solvents are evaporated in vacuo, the residue dissolved in ether and the ether solution washed with dilute ammonium hydroxide solution. The ether layer is dried over sodium sulfate, filtered and evaporated in vacuo to dryness to yield the title product.

EXAMPLE 45 l-2-Cyclopropylmethyl-9β-hydroxy-2'-methoxy-5-methyl-6,7-benzomorphan acetate l-XIa free base (0.001 mole) is dissolved in 1 ml of acetic anhydride and 0.08 ml of pyridine and refluxed for 1 hour. The solvents are evaporated in vacuo, the residue dissolved in ether and the ether solution washed with dilute ammonium hydroxide solution. The ether layer is dried over sodium sulfate, filtered and evaporated in vacuo to dryness to yield the title product.

EXAMPLE 46 l-2-Cyclopropylmethyl-2',9β-dihydroxy-5-methyl-6,7-benzomorphan 9β-monoacetate l-acetate (0.001 mole) obtained in example 45, dissolved in 5 ml of methylene chloride, is added with stirring to a cooled solution (−10°C) of B Br$_3$ (0.002 mole). The ice bath is removed and the reaction mixture left at room temperature for 30 minutes. The mixture is poured into crushed ice and concentrated ammonium hydroxide and extracted with chloroform. After drying over sodium sulfate and evaporation of the solvent, a residue of title product is obtained.

EXAMPLE 47

2-Cyclopropylbutyl-2',9β-dihydroxy-5,9α-dimethyl-6,7-benzomorphan 2'-(4-nicotinoate)

To a solution of 0.002 mole of compound XIIc free base in 3 ml of pyridine is added 0.002 mole of 4-nicotinoyl chloride hydrochloride. The mixture is refluxed for 1 hour and the solvents evaporated. The residue is partitioned between ether and dilute ammonium hydroxide, the ether layer separated, washed with water, dried over anhydrous sodium sulfate, filtered and evaporated in vacuo to produce the desired title nicotinoyl ester.

EXAMPLE 48 l-2-Cyclopropylmethyl-2'-9β-dihydroxy-5-methyl-6,7-benzomorphan 2'-(3-nicotinoate-N-oxide)

Substitution in the procedure of Example 47 for the 4-nicotinoyl chloride hydrochloride used therein of an equimolar quantity of 3-nicotinoyl chloride-N-oxide produces the desired title ester.

EXAMPLE 49

2'-Monomethoxymethyl ether of l-2-cyclopropylmethyl-2'-9β-dihydroxy-5-methyl-6,7-benzomorphan Chloromethylmethylether (0.01 mole) is placed into 10 ml of dry dimethylformamide and the resulting solution is added to 0.0075 mole of compound l-XIIc free base dissolved in 20 ml of dry dimethylformamide. Anhydrous sodium carbonate (0.011 mole) as a fine powder is added to the solution with stirring at about room temperature. Stirring is continued for about 5 hours. The solution is filtered from the sodium carbonate, evaporated to dryness in vacuo to produce the essentially pure title product.

EXAMPLE 50

2-Allyl-9β-hydroxy-2'-methoxy-5-methyl-6,7-benzomorphan hydrobromide (XIe)

A mixture of (0.0052m), allyl bromide (0.007 m) and potassium carbonate (2 g) in 15 ml acetonitrile was heated at reflux for 18 hours. The solids were removed by filtration and the filtrate concentrated. The residue was treated with water and extracted with ethyl acetate which on drying and concentration gave a crystalline solid. This material was converted to a hydrobromide salt with conc hydrobromic acid in 2-propanol to give pure XIe; mp 224°–229°C.

Anal. calc'd. for $C_{17}H_{23}NO_2 \cdot HBr$: C, 57.63; H, 6.83; N, 3.95.
Found: C, 57.46; H, 6.65; N, 4.00.

We claim:

1. A compound having the formula

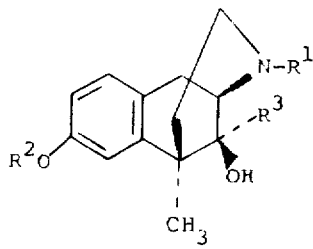

XXX wherein R¹ is selected from the group consisting of

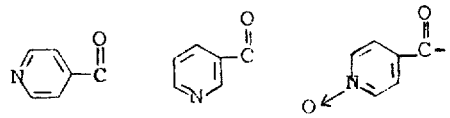

in which R⁶ is H or CH₃; R² is selected from the group consisting of H, (lower) alkyl, (lower)alkanoyl,

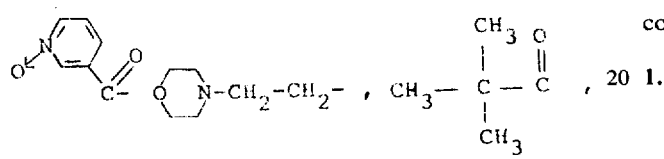

R³ is H, CH₃, C₂H₅, n-C₃H₇, and —CH₂—CH=CH₂, or a pharmaceutically acceptable acid addition salt thereof.

2. The compound of claim 1 wherein R³ is methyl, R² is H, and R¹ is cyclobutylmethyl; or an acid addition salt thereof.

3. The compound of claim 1 wherein R² and R³ are H, and R¹ is cyclopropylmethyl; or an acid addition salt thereof.

4. The essentially pure levorotatory isomer of the compound of claim 2.

5. The essentially pure levorotatory isomer of the compound of claim 3.

6. The hydrochloride salts of the compounds of claim 1.

* * * * *

UNITED STATES PATENT OFFICE
CERTIFICATE OF CORRECTION

Patent No. 3,891,657     Dated June 24, 1975

Inventor(s) Ivo Monkovic et al.

It is certified that error appears in the above-identified patent and that said Letters Patent are hereby corrected as shown below:

Add inventor -- Yvon Lambert, Catherine, Canada --.

Signed and Sealed this second Day of December 1975

[SEAL]

Attest:

RUTH C. MASON
Attesting Officer

C. MARSHALL DANN
Commissioner of Patents and Trademarks